Aug. 23, 1966 R. B. ADAMS ET AL 3,267,946
FLOW CONTROL APPARATUS
Filed April 12, 1963 3 Sheets-Sheet 1
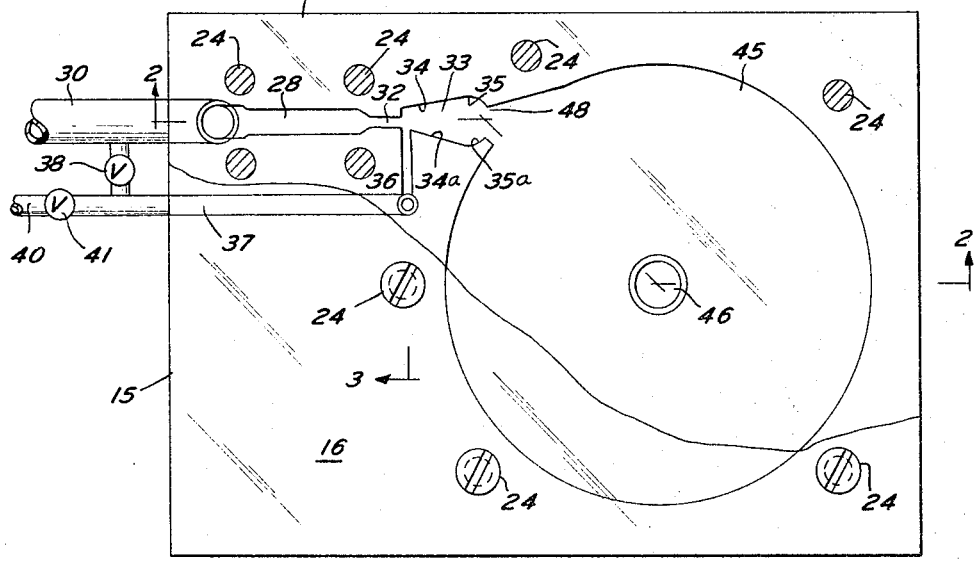
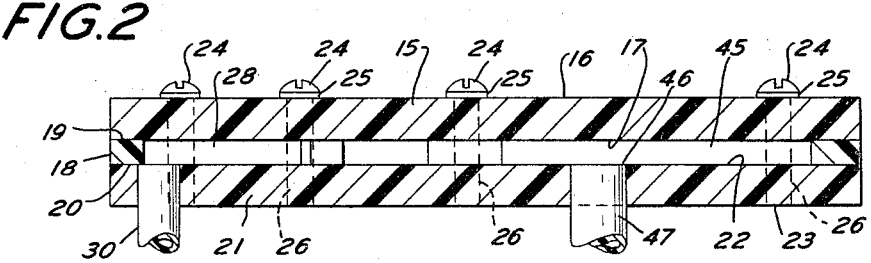
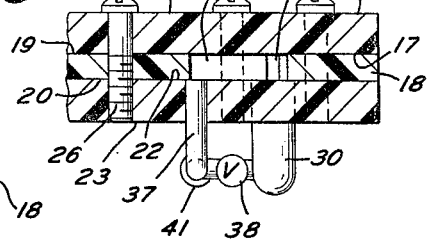
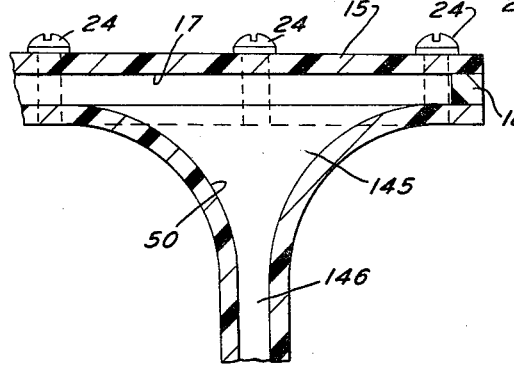
INVENTORS
ROBERT B. ADAMS
COLEMAN B. MOORE
BY
B. T. Wolfensmith
ATTORNEY

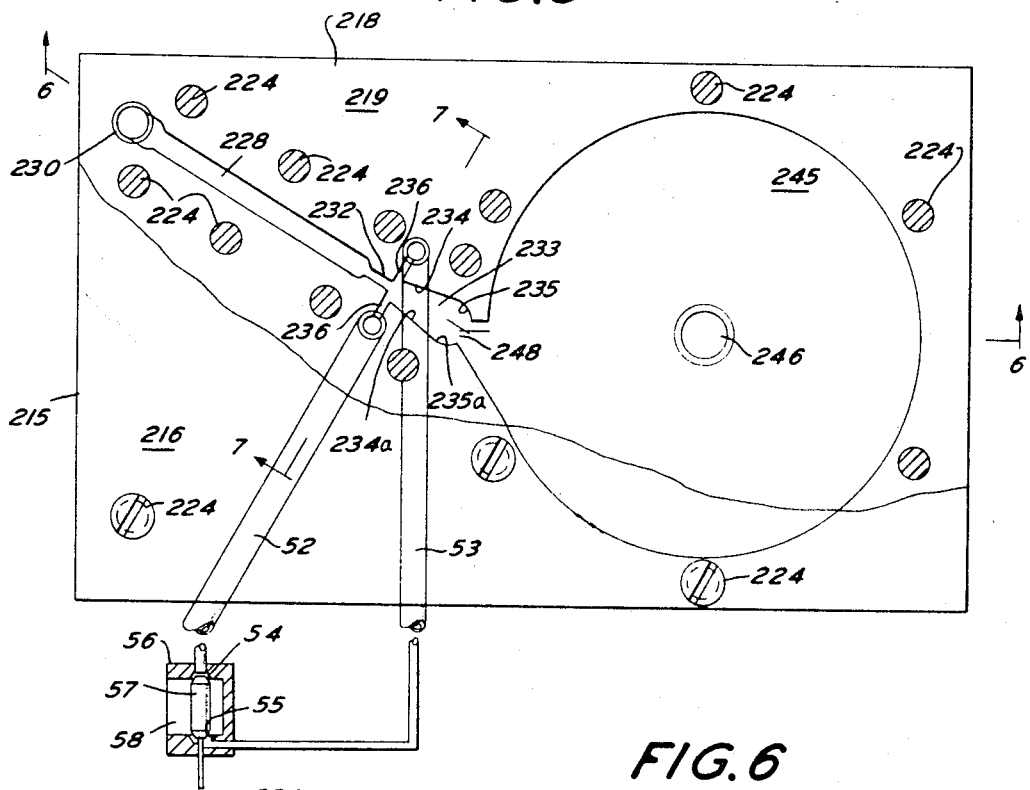
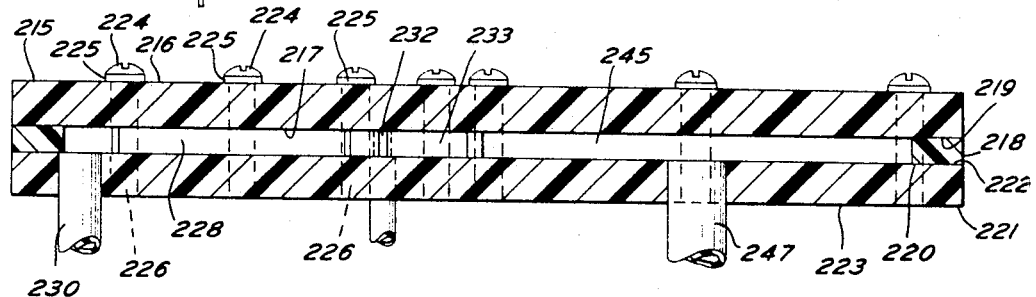
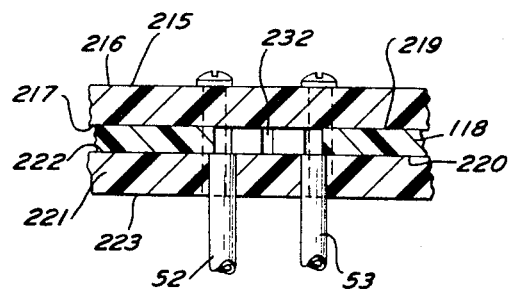
INVENTORS
ROBERT B. ADAMS
COLEMAN B. MOORE
BY
ATTORNEY Aug. 23, 1966    R. B. ADAMS ET AL    3,267,946
FLOW CONTROL APPARATUS
Filed April 12, 1963    3 Sheets-Sheet 3

INVENTORS
ROBERT B. ADAMS
COLEMAN B. MOORE
BY
B.T. Wobensmith
ATTORNEY

United States Patent Office 3,267,946
Patented August 23, 1966

3,267,946
FLOW CONTROL APPARATUS
Robert B. Adams, Abington, and Coleman B. Moore, Uwchland, Pa., assignors to Moore Products Co., Philadelphia, Pa., a corporation of Pennsylvania
Filed Apr. 12, 1963, Ser. No. 272,663
11 Claims. (Cl. 137—81.5)

This invention relates to fluid flow control apparatus.

It has heretofore been proposed to control the direction of flow of a jet of fluid in accordance with a signal applied to control ports positioned in a jet interaction chamber and to separate the jet into streams having different quantities therein.

It is the principal object of the present invention to provide flow control apparatus in which the directional positioning of a fluid jet is utilized to determine the impedance to fluid flow in the apparatus.

It is a further object of the present invention to provide flow control apparatus in which a vortex chamber has a fluid jet directed thereinto, the control of the direction of the fluid jet determining the impedance action of the chamber.

It is a further object of the present invention to provide flow control apparatus having a fluid jet communicating with a chamber at a selected direction, the control of the direction determining the proportioning action of the apparatus.

It is a further object of the invention to provide fluid flow control apparatus in which accurate control of proportioning can be obtained over a wide range of operating conditions.

It is a further object of the present invention to provide fluid flow control apparatus in which a jet is directionally controlled to determine the flow and in which no mechanical moving parts are employed at or along the controlling jet.

It is a further object of the present invention to provide apparatus of the character aforesaid capable of control by a single signal, and in which the structure is readily reversible as to the effect of the signal.

It is a further object of the present invention to provide fluid flow control apparatus in which a jet is directionally controlled to determine the flow and in which no mechanical moving parts are employed at or along the controlled jet, the range being enhanced by the use of auxiliary structure.

Other objects and advantageous features of the invention will be apparent from the description and claims.

The nature and characteristic features of the invention will be more readily understood from the following description, taken in connection with the accompanying drawings forming part thereof, in which:

FIGURE 1 is a top plan view of one preferred form of fluid flow control apparatus in accordance with the invention, with a single control port, part of the cover plate being broken away;

FIG. 2 is a vertical sectional view taken approximately on the line 2—2 of FIG. 1 and showing one form of vortex chamber;

FIG. 3 is a vertical sectional view taken approximately on the line 3—3 of FIG. 1;

FIG. 4 is a fragmentary vertical sectional view similar to FIG. 2, showing another form of vortex chamber;

FIG. 5 is a top plan view of another preferred form of fluid flow control apparatus in accordance with the invention, with a pair of control ports, part of the cover plate being broken away;

FIG. 6 is a vertical sectional view taken approximately on the line 6—6 of FIG. 5;

FIG. 7 is a vertical sectional view taken approximately on the line 7—7 of FIG. 5;

Figure 8:
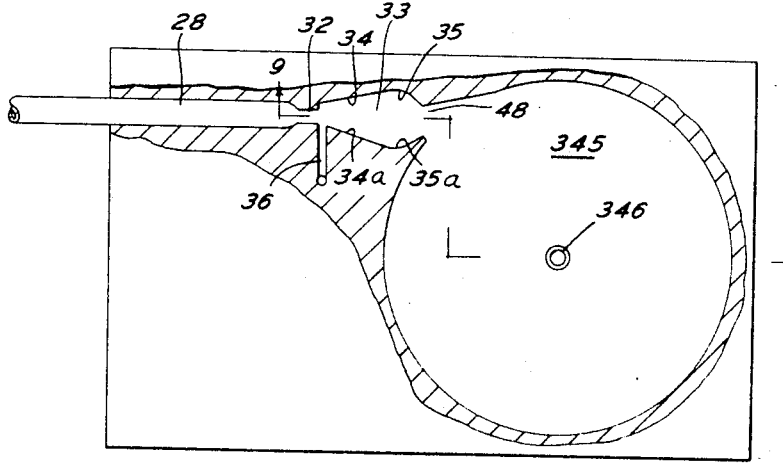
FIG. 8 is a top plan view of another preferred form of fluid flow control apparatus in accordance with the invention part of the cover plate being broken away.

It should, of course, be understood that the description and drawings herein are illustrative merely, and that various modifications and changes can be made in the structure disclosed without departing from the spirit of the invention.

Like numerals refer to like parts throughout the several views.

Fluid flow control devices have been proposed in which the flow is controlled by pure fluid interaction of a jet discharging into an interaction chamber which chamber has opposite side walls symmetrical with respect to the longitudinal axis of the jet. In such devices regions on both sides of the jet delineated by the side walls of the interaction chamber and the jet stream had one control connection or opposite control connections contiguous to the entrance location of the jet for input or discharge as determined by the relation of pressure conditions in the chamber to the ambient pressure.

In fluid flow devices, also, vortex chambers of various shapes and the flow of fluid therein have been known.

The present invention utilizes a jet interaction chamber with a vortex chamber to provide a variable impedance to fluid flow.

Referring now more particularly to FIGS. 1, 2 and 3 of the drawings, a cover plate 15 is shown which can be of generally rectangular or other shape as desired, with an upper face 16 and a lower face 17. The plate 15 can be made of any desired material, such as metal, synthetic resinous plastic or the like, which is not subject to corrosion by the fluid or fluids in contact therewith.

An intermediate plate 18 is provided which can also be of any suitable material with an upper face 19 and a lower face 20, and with the interior thereof shaped as hereinafter described.

A bottom closure plate 21 is provided, of any desired material, having an upper face 22 and a lower face 23.

The plates 15, 18 and 21 are secured together in any desired manner with the faces 17 and 19 and the faces 20 and 22 in fluid tight engagement. For this purpose, bolts 24 having washers 25 under their heads can be provided in threaded engagement in openings 26 in the bottom plate 21.

The plate 18 has a fluid inlet passageway 28 provided therein with which a fluid supply connection 30 is in communication through the plate 21. The fluid supply connection 30 can have the fluid whose flow is to be controlled supplied thereto, and the fluid can be liquid or gaseous, as desired.

The plate 18 has a nozzle 32 with which the passageway 28 is in communication. The nozzle 32 communicates with an interaction chamber 33 having opposite diverging wall portions 34 and 34a, asymmetrical to impart a bias to one wall portion. For example, portion 34 contiguous to the nozzle 32 may be set back. The interaction chamber 33 also has continuous return wall portions 35 and 35a. Extending to the chamber 33, immediately beyond the nozzle 32, a control fluid connection 36 is provided. The fluid connection 36 is connected to a source of fluid. For this purpose a fluid connection 37 can extend to the fluid supply connection 30 with a valve 38 interposed therein and can also, if desired, be connected to an independent source of fluid, such as by a fluid connection 39 with a valve 40 interposed therein.

The plate 18, beyond the termini of the wall portions 35 and 35a has a vortex chamber 45 therein, shown in FIGS. 1, 2 and 3, as cylindrical, and bounded by the lower face 17 of the plate 15 and the upper face 22 of the plate 21. The vortex chamber 45 has a central discharge opening 46 from which a fluid delivery pipe 47 extends.

A throat 48 is provided between the interaction chamber 33 and the vortex chamber 45. The longitudinal axis of the jet established by the nozzle 32 and the wall portions 35 and 35a is disposed so that the direction of delivery of the jet into the vortex chamber 45 can be varied as desired over a wide range of positions between predetermined limits of radial and peripheral delivery. A jet travelling along the wall portions 34 and 35 and entering the vortex chamber 45 will move substantially radially in the chamber 45 toward the discharge opening 46. A jet travelling along the wall portions 34a and 35a will enter the vortex chamber 45 substantially tangentially and travel in a spiral path to the discharge opening 46. Intermediate the two extreme or limit positions of the jet just referred to, other positions of the jet will be available.

Referring now more particularly to FIG. 4 of the drawings another form of vortex chamber 145 is shown in which the chamber 145 has a curved lower boundary wall 50 of curved or funnel shape provided in the lower plate 21 with an upper flat boundary wall 17 provided by the upper plate 15. A central discharge opening 146 offset from the plane of the inlet to the chamber 145 is provided for discharge of the fluid for delivery.

Referring now more particularly to FIGS. 5, 6 and 7 of the drawings an embodiment of the invention is shown in which a pair of central ports are employed in the jet interaction chamber.

The cover plate 215, of generally rectangular shape, has an upper face 216 and a lower face 217, and is made of any desired material, as before.

The intermediate plate 218, also of any desired material, has an upper face 219 for engagement with the lower face 217 and has a lower face 220.

A bottom plate 221 is also provided, having an upper face 222 for engagement with the lower face 220 and a lower face 223.

The plates 215, 218 and 221 are secured together, as before, by bolts 224 having washers 225 under their heads, the bolts 224 engaging in threaded openings 226 in the bottom plate 221.

The plate 218 has a fluid inlet passageway 228 provided therein with which a fluid supply connection 230 is in communication.

The plate 218 has a nozzle 232 with which the passageway 228 is in communication. The nozzle 232 communicates with an interaction chamber 233 having opposite symmetrical diverging wall portions 234 and 234a and continuous return wall portions 235 and 235a. In the chamber 233, immediately beyond the nozzle 232, opposite control fluid connections 236 are provided. The fluid connections 236 are connected by pipes 52 and 53 to ports 54 and 55 in a control valve housing 56. The housing 56 can have a manually or otherwise operable valve plug 57 therein for controlling the ports 54 and 55 and the flow of fluid through the pipes 52 and 53. The inlet 58 to the housing 56 can be connected to a source of fluid, as desired.

The plate 218, beyond the termini of the wall portions 235 and 235a has a vortex chamber 245 therein, shown as cylindrical, bounded by the lower face 217 of the plate 216 and the upper face 222 of the plate 221. The vortex chamber 245 has a central discharge opening 246 from which a fluid delivery pipe 247 extends.

A throat 248 is provided between the interaction chamber 233 and the vortex chamber 245. The longitudinal axis of the jet established by the nozzle 232 and the wall portions 234 and 234a is disposed so that a jet travelling along the wall portions 234a and 235a will move substantially radially in the vortex chamber 245 toward the discharge opening 246 and so that a jet travelling along the wall portions 234 and 235 will enter the vortex chamber 245 substantially tangentially and for travel in a spiral path to the discharge opening 246. Intermediate the two limit or extreme positions of the jet just referred to, other positions of the jet will be available.

The length of the interaction chambers 33 and 233 can be selected as desired, but are preferably such that the ratio of the chamber length to the nozzle width is in the range from about seven to one to about five to one.

Figure 9:
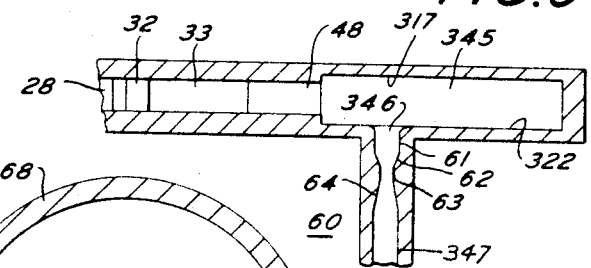
FIG. 9 is a vertical sectional view taken approximately on the line 9—9 of FIG. 8.

Referring now more particularly to FIGS. 8 and 9, the structure there shown in generally similar to that shown in FIGS. 1 and 2, with a fluid inlet passageway 28, nozzle 32, interaction chamber 33, diverging wall portions 34 and 34a, return wall portions 35 and 35a, control fluid connection 36 and throat 48.

The vortex chamber 345 is greater in height than the height of the throat 48 with upper and lower bounding faces 317 and 322. A central discharge opening 346 has a venturi 60 therebelow with a fluid connection 61, a converging venturi approach section 62, a venturi throat 63, and a diverging recovery section 64 connected to a discharge pipe 347.

Figure 10:
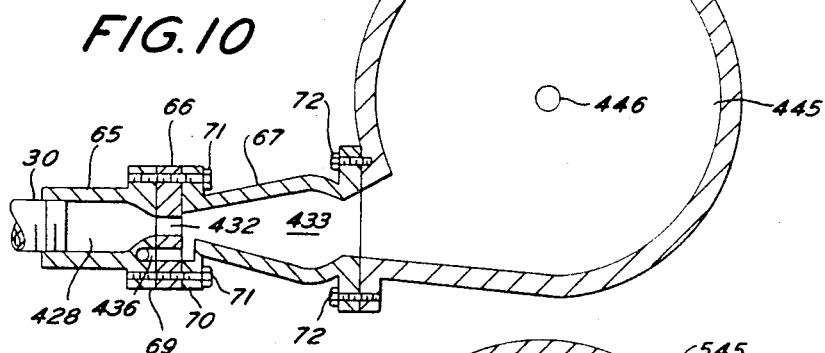
FIG. 10 is a horizontal sectional view of another preferred form of fluid flow control apparatus in accordance with the invention with reversibility of the assembly for control.

Referring now more particularly to FIG. 10, the construction there illustrated is made of a plurality of castings or preformed sections including a supply housing section 65 with a fluid inlet passageway 428, to which a supply connection 30 is connected, a nozzle section 66 with a nozzle 432, an interaction chamber section 67 with an interaction chamber 433 therein, and a vortex chamber section 68 with a vortex chamber 445 therein.

The supply housing section 65 and interaction chamber section 67 have flanges 69 and 70 for clamping of a nozzle section 66 of selected size therebetween dependent upon the nozzle characteristics desired. The flanges 69 and 70 and the selected nozzle section 66 can be held in assembled relation by bolts 71.

The vortex chamber section 68 and interaction chamber section 67 are also held in assembled relation and in selected orientation by bolts 72. A single control fluid connection 436 can be employed, dependent upon the orientation of the interaction chamber section 67 with respect to the vortex chamber section 68, to direct the jet from the nozzle section 66 either toward the periphery of the vortex chamber 445 or toward the discharge opening 446 for a particular control fluid condition. In this manner it is possible for an increase in the control fluid supplied through the fluid connection 436 to cause an increase in the flow through the delivery connection for one arrangement or for an increase in the control fluid supplied to cause a decrease in the flow through the delivery connection for the opposite arrangement.

Figure 11:
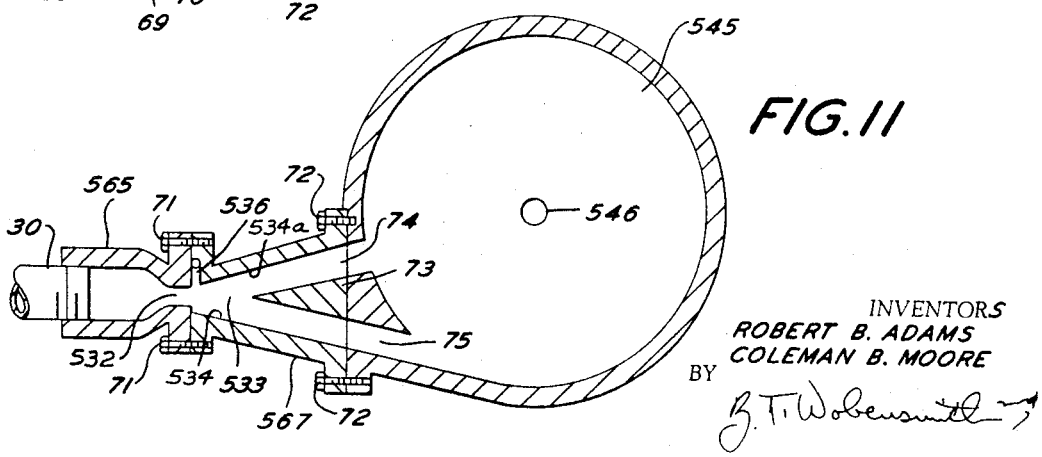
FIG. 11 is a view similar to FIG. 10 showing another preferred form of fluid flow control apparatus with reversibility of the assembly for control.

FIGURE 11 shows an alternate vortex arrangement for controlling the discharge of fluid. As shown here, this construction comprises three main body portions; an inlet section 565 having a nozzle 532, a fluid interaction section 567 having therein a fluid interaction chamber 533, two fluid passageways 74 and 75 separated by a divider 73 are contiguous with chamber 533 and a control fluid passageway 536 communicates with interaction chamber 533 along one of its side walls 534a adjacent to the point of entry of the fluid jet at 532. The opposite side wall 534 is offset slightly from the entering jet 532. A vortex section comprising a cylindrical vortex chamber 545 having a co-axial outlet 546 in one end is attached to the fluid interaction section 567 so that the passageways 74 and 75 continue and enter the vortex chamber, one being directed radially and the other tangentially with respect to the vortex chamber 545. The means of attaching interaction chamber 567 to the vortex chamber 568 is symmetrical with respect to passageways 74 and 75 so that the assembly may be assembled in reverse relationship to that illustrated, thereby reversing the effect of the control fluid at 536 on the discharge of fluid through the delivery connection 546. In this manner it is possible for an increase in the control fluid supplied through the fluid connection 536 to cause a decrease in flow through delivery connection for one arrangement, as shown, or for an increase in the control fluid supplied to cause an increase in the flow through the delivery connection for the opposite arrangement.

The mode of operation will now be pointed out reference being had first to FIGS. 1, 2 and 3.

Assume that fluid is supplied through the fluid supply connection 30, through the fluid inlet passageway 28 and the nozzle 32 into the interaction chamber 33.

If the fluid connection 36 is open and capable of supplying fluid, such fluid will create a higher pressure condition along the wall portion 34a than along the wall portion 34 so that the jet is influenced to move to the wall portion 34 and will continue along the wall 35 and enter the vortex chamber 45 substantially radially. If the fluid connection 36 is closed, then the jet will favor flowing along the wall portion 34a because of the set back of the wall portion 34 from the nozzle 32 and the absence of set back of the wall portion 34a, and will continue along the wall 35a and will enter the vortex chamber 45 substantially tangentially.

Assume further that the fluid pressure conditions in the chamber 33 as determined by the pressure conditions at the control fluid connection 36 are such that the flow is radial. This direct radial flow is the condition of minimum impedance and accordingly of maximum flow.

If now the pressure conditions at the control fluid connection 36 are changed, such as by partial reduction of fluid supplied therethough, as controlled by the valve 38 with the valve 41 closed, or by the valve 41 with the valve 38 closed, the impedance will be increased as the delivery through the throat 48 is shifted to a lesser or greater extent from the initial radial path referred to.

The maximum impedance will be that in which the jet from the nozzle 32 is directed so as to enter the vortex chamber 45 peripherally or tangentially, with the maximum vortex action in the vortex chamber 45 providing a maximum impedance.

The impedance for intermediate angular positions of entry into the vortex chamber 45 of the jet from the interaction chamber 33 will vary between the limits for the entry positions of the jet and in a manner wihch permits of proportional control of the flow to the discharge opening 46 and delivery pipe 47.

Referring now to FIGS. 5, 6 and 7, the operation of the structure there shown is similar to that previously described except that the jet positioning will be subject to the opposite signals available at the fluid connections 236, as determined by the positioning of the valve 57 with respect to the ports 54 and 55.

Referring now to FIGS. 8 and 9, the operation of the structure there shown is also similar to that previously described except that the interposition of the venturi between the vortex chamber 34 and the discharge pipe 346 gives an increase in the range of proportioning. This is based on the flow characteristics of a venturi in which fluid flowing in a swirling path at the entrance is impeded more than that having a straight line flow pattern at the entrance.

Referring now to FIG. 10, the operation of that structure is similar to those previously discussed with reversibility of the effect of the control pressure if desired.

Referring now to FIG. 11 a radial fluid path at 74 is provided at the entrance to the vortex chamber 545 and a tangential fluid path is provided at 75. These passageways at 74 and 75 receive fluid from the nozzle 532 in jet form and under the control of the fluid supplied in the fluid connection 536.

With sufficient fluid supplied through the fluid connection 536 the entire jet will be directed through the passageway 75 giving the maximum restrictive action in the vortex chamber 545.

With the fluid connection 536 closed the entire jet will be directed through the passageway 74, giving the minimum restrictive action in the vortex chamber 545.

At intermediate fluid supply conditions in the fluid connection 536, the jet will be split by the divider 73 so that different proportions are directed through passageways 74 and 75 giving intermediate restrictive actions in the vortex chamber 545.

We claim:
1. Fluid flow control apparatus comprising
   a vortex chamber whose section is substantially a circle in one plane,
   said vortex chamber having an outlet axially disposed with respect to said chamber section,
   a fluid inlet portion in the peripheral wall of said chamber,
   means exteriorly of said chamber for supplying a fluid jet through said inlet portion,
   said means having members for varying the direction of said jet at the point where it enters said chamber in a range between delivery radially toward said vortex chamber outlet and tangentially in said vortex chamber for discharge.

2. Fluid flow control apparatus as defined in claim 1 in which said means comprises a fluid interaction chamber with a nozzle for initially directing the jet thereinto, said interaction chamber has opposite side walls, and said direction varying members include a fluid connection to at least one of said side walls controlling the positioning of the jet.

3. Fluid flow control apparatus as defined in claim 1 in which said fluid interaction device has a divider therein for forming said throat portion and for separating the fluid from said nozzle into two streams.

4. Fluid flow control apparatus as defined in claim 1 in which said fluid interaction device is reversibly mounted with respect to said vortex chamber about the longitudinal axis of said inlet nozzle.

5. Fluid flow control apparatus as defined in claim 1 in which a separable nozzle is provided.

6. Fluid flow control apparatus comprising a vortex chamber having a central discharge opening, said vortex chamber at the periphery thereof having an inlet portion with a part directing fluid radially interiorly of said chamber and a part directing fluid tangentially interiorly of said chamber, a source of fluid, and means exteriorly disposed with respect to said vortex chamber for varying the distribution of fluid from said source between said parts of said inlet portion comprising a fluid interaction chamber outside said vortex chamber into which the fluid from said source is delivered, said fluid interaction chamber having a control fluid connection connected thereto, said fluid interaction chamber being asymmetrical and having a single control port therein.

7. Fluid flow control apparatus comprising a vortex chamber having an inlet portion at the side thereof and a central discharge opening, and members for delivering a fluid jet into said vortex chamber at said inlet portion, said last members including a member for varying the direction of delivery of said jet into said vortex chamber in a range between delivery radially toward said discharge opening and peripherally in said vortex chamber, said vortex chamber having the discharge opening of converging shape merging with the vortex chamber.

8. Fluid flow control apparatus comprising a vortex chamber having an inlet portion at the side thereof and a central discharge opening, and members for delivering a fluid jet into said vortex chamber at said inlet portion, said last members including a member for varying the direction of delivery of said jet into said vortex chamber in a range between delivery radially toward said discharge opening and peripherally in said vortex chamber, said vortex chamber at the discharge opening having a device connected thereto with greater resistance to swirling flow than to straight flow.

9. Fluid flow control apparatus comprising a vortex chamber having an inlet portion at the side thereof and a central discharge opening, and members for delivering a fluid jet into said vortex chamber at said inlet portion, said last members including a member for varying the direction of delivery of said jet into said vortex chamber in a range between delivery radially toward said discharge opening and peripherally in said vortex chamber, said vortex chamber at the discharge opening having a venturi device connected thereto.

10. Fluid flow control apparatus comprising a vortex chamber having an inlet portion at the side thereof and a central discharge opening, and members for delivering fluid into said vortex chamber at said inlet portion, said last members including a fluid interaction device having an inlet nozzle, side walls extending beyond said nozzle and a fluid control connection to at least one of said side walls, said vortex chamber at the discharge opening having a device connected thereto with greater resistance to swirling flow than to straight flow.

11. Fluid flow control apparatus comprising a vortex chamber having an inlet portion at the side thereof and a central discharge opening, and members for delivering fluid into said vortex chamber at said inlet portion, said last members including a fluid interaction device having an inlet nozzle, side walls extending beyond said nozzle and a fluid control connection to at least one of said side walls, said vortex chamber at the discharge opening having a venturi device connected thereto.

References Cited by the Examiner

UNITED STATES PATENTS

| | | |
|---|---|---|
| 1,381,095 | 6/1921 | Starr. |
| 1,517,598 | 12/1924 | Stevenson. |
| 3,001,539 | 9/1961 | Hurvitz _____ 137—81.5 |
| 3,075,227 | 1/1963 | Bowles _____ 137—81.5 X |
| 3,107,850 | 10/1963 | Warren et al. _____ 137—81.5 |
| 3,143,856 | 8/1964 | Hausmann _____ 137—608 X |
| 3,171,915 | 3/1965 | Johnson. |
| 3,181,546 | 5/1965 | Boothe _____ 137—81.5 |
| 3,192,938 | 7/1965 | Bauer _____ 137—81.5 |

OTHER REFERENCES

Fluid Jet Control Devices, A.S.M.E. TJ 935, S95, 1962 C. 2 p. 8.

M. CARY NELSON, *Primary Examiner.*

LAVERNE D. GEIGER, *Examiner.*

S. SCOTT, *Assistant Examiner.*